(12) United States Patent
Jang et al.

(10) Patent No.: US 11,950,278 B2
(45) Date of Patent: Apr. 2, 2024

(54) METHOD AND DEVICE FOR PERFORMING GROUPING FOR SENSING IN WIRELESS LAN SYSTEM

(71) Applicant: LG ELECTRONICS INC., Seoul (KR)

(72) Inventors: Insun Jang, Seoul (KR); Jeongki Kim, Seoul (KR); Jinsoo Choi, Seoul (KR); Dongguk Lim, Seoul (KR); Sanggook Kim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/377,957

(22) Filed: Oct. 9, 2023

(65) Prior Publication Data

US 2024/0049280 A1 Feb. 8, 2024

Related U.S. Application Data

(63) Continuation of application No. 18/007,531, filed as application No. PCT/KR2021/006957 on Jun. 3, 2021.

(60) Provisional application No. 63/034,996, filed on Jun. 5, 2020.

(51) Int. Cl.
*H04W 74/08* (2009.01)
*H04W 76/11* (2018.01)
*H04W 84/12* (2009.01)

(52) U.S. Cl.
CPC ............ *H04W 74/08* (2013.01); *H04W 76/11* (2018.02); *H04W 84/12* (2013.01)

(58) Field of Classification Search
CPC ...... H04W 74/08; H04W 76/11; H04W 84/12
See application file for complete search history.

(56) References Cited

U.S. PATENT DOCUMENTS

2014/0126394 A1* 5/2014 Stephens ........... H04W 56/0065
370/252
2014/0301219 A1* 10/2014 Ben-Haim ............ G01S 13/765
370/252
2020/0363524 A1* 11/2020 Yoon ................... H04W 12/069

OTHER PUBLICATIONS

LG Electronics, "Discussion on WLAN Sensing Procedure", doc.: IEEE 802.11-20/1804r0, Nov. 9, 2020.
Intel, "Considerations of sensing negotiation", doc.: IEEE 802.11-21/0370r1, Mar. 5, 2021.

* cited by examiner

*Primary Examiner* — Siren Wei
(74) *Attorney, Agent, or Firm* — BRYAN CAVE LEIGHTON PAISNER LLP

(57) ABSTRACT

In a wireless local area network (wireless LAN) system, a transmitting STA can transmit, to a receiving STA, a grouping initiation frame for generating a group that is to perform sensing. The grouping initiation frame can include information related to a session identifier (ID) for a sensing session and to the number of transmission times of a sensing signal performed in the sensing session. The transmitting STA can receive a grouping response frame from the receiving STA. The receiving STA can be included in the group on the basis of the reception of the grouping response frame from the receiving STA within a threshold time preset from the transmission time of the grouping initiation frame. The sensing session can include at least one transmission opportunity (TXOP).

6 Claims, 17 Drawing Sheets

(a)

(b)

METHOD AND DEVICE FOR PERFORMING GROUPING FOR SENSING IN WIRELESS LAN SYSTEM

This application is a Continuation of U.S. patent application Ser. No. 18/007,531 filed Dec. 1, 2022, which is a National Stage filing under 35 U.S.C. 371 of International Application No. PCT/KR2021/006957 filed on Jun. 3, 2021, which claims the benefit of Provisional Application No. 63/034,996 filed on Jun. 5, 2020, the contents of which are all hereby incorporated by reference herein in their entirety.

TECHNICAL FIELD

The present specification relates to a grouping scheme for sensing in a wireless local area network (WLAN) system, and more particularly, to a grouping procedure for performing sensing, and a signaling method.

BACKGROUND

A wireless local area network (WLAN) has been improved in various ways. For example, IEEE 802.11bf WLAN sensing is the first standard which converges communication and radar technologies. Although there is a rapid increase in a demand for unlicensed frequencies in daily life throughout overall industries, due to a limitation in frequencies to be newly provided, it is very preferable to develop the technology of converging the communication and the radar in terms of increasing frequency utilization efficiency. A sensing technology which detects a movement behind a wall by using a WLAN signal or a radar technology which detects an in-vehicle movement by using a frequency modulated continuous wave (FMCW) signal at a 70 GHz band has been conventionally developed, but it may have significant meaning in that sensing performance can be raised up by one step in association with the IEEE 802.11bf standard. In particular, since privacy protection is increasingly emphasized in modern society, a WLAN sensing technology which is legally freer from invasion of privacy is more expected, unlike CCTV.

Meanwhile, an overall radar market throughout automobiles, national defense, industries, daily life, or the like is expected to grow until an average annual growth rate reaches up to a level of about 5% by 2025. In particular, in case of a sensor used in daily life, it is expected to rapidly grow up to a level of 70%. Since the WLAN sensing technology is applicable to a wide range of daily life such as motion detection, breathing monitoring, positioning/tracking, fall detection, in-vehicle infant detection, appearance/proximity recognition, personal identification, body motion recognition, behavior recognition, or the like, it is expected to contribute to enhancing competitiveness of companies.

SUMMARY

A transmitting station (STA) in a wireless local area network (WLAN) system according to various embodiments may transmit to a receiving STA a grouping initiation frame to create a group for performing sensing. The grouping initiation frame may include a session identifier (ID) for a sensing session and information related to the number of times of transmitting a sensing signal, performed in the sensing session. The transmitting STA may receive from the receiving STA a grouping response frame. The receiving STA may be included in the group, based on that the grouping response frame is received from the receiving STA within a pre-set threshold time from a transmission time of the grouping initiation frame. The sensing session may include at least one transmission opportunity (TXOP).

According to an example of the present specification, STAs for participating in sensing may be selected to create a group, and WLAN sensing may be performed through the STAs included in the group. A sensing process may be controlled at a later time through a process of selecting the STAs for participating in sensing, and a collision may be prevented from occurring in the sensing process by including time information for sensing.

DETAILED DESCRIPTION

In the present specification, "A or B" may mean "only A", "only B" or "both A and B". In other words, in the present specification, "A or B" may be interpreted as "A and/or B". For example, in the present specification, "A, B, or C" may mean "only A", "only B", "only C", or "any combination of A, B, C".

A slash (/) or comma used in the present specification may mean "and/or". For example, "A/B" may mean "A and/or B". Accordingly, "A/B" may mean "only A", "only B", or "both A and B". For example, "A, B, C" may mean "A, B, or C".

In the present specification, "at least one of A and B" may mean "only A", "only B", or "both A and B". In addition, in the present specification, the expression "at least one of A or B" or "at least one of A and/or B" may be interpreted as "at least one of A and B".

In addition, in the present specification, "at least one of A, B, and C" may mean "only A", "only B", "only C", or "any combination of A, B, and C". In addition, "at least one of A, B, or C" or "at least one of A, B, and/or C" may mean "at least one of A, B, and C".

Technical features described individually in one figure in the present specification may be individually implemented, or may be simultaneously implemented.

The following example of the present specification may be applied to various wireless communication systems. For example, the following example of the present specification may be applied to a wireless local area network (WLAN) system. For example, the present specification may be applied to the IEEE 802.11ad standard or the IEEE 802.11ay standard. In addition, the present specification may also be applied to the newly proposed WLAN sensing standard or IEEE 802.11bf standard.

Hereinafter, in order to describe a technical feature of the present specification, a technical feature applicable to the present specification will be described.

Figure 1:
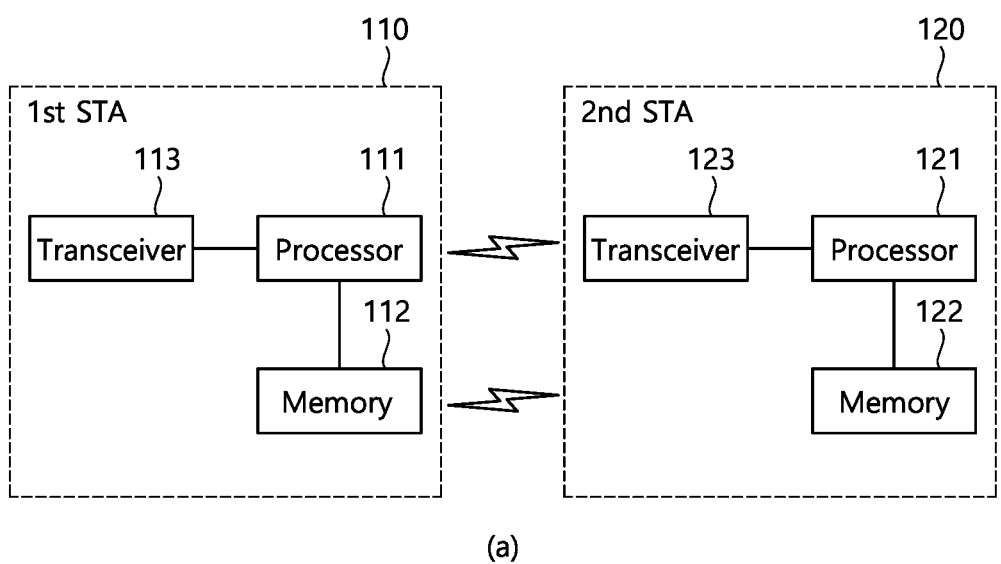
FIG. 1 illustrates an example of a transmitting apparatus and/or receiving apparatus of the present specification.
Figure 1:
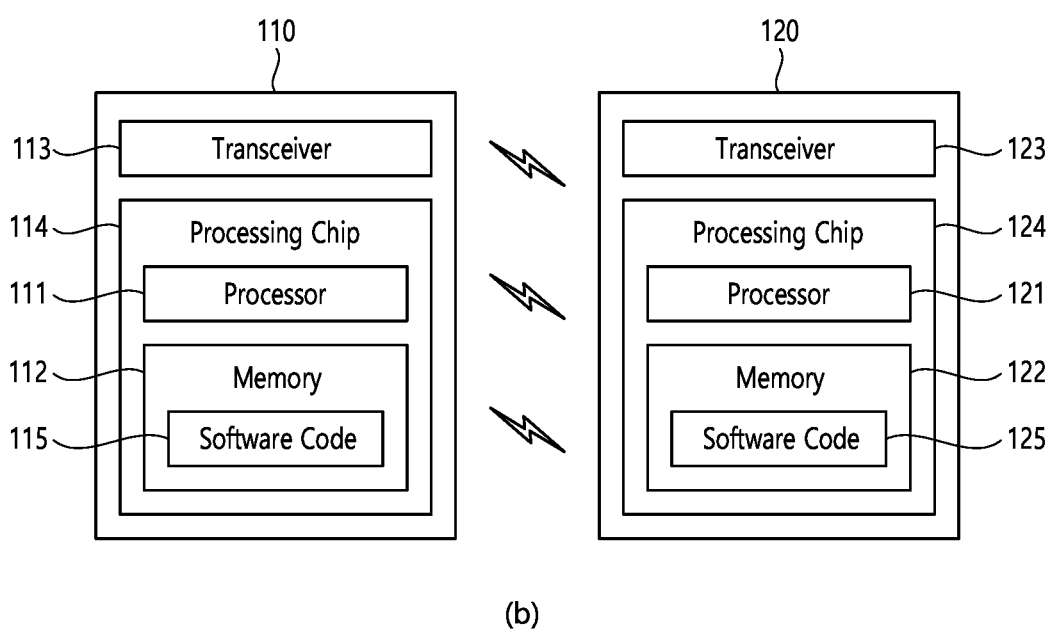

FIG. 1 shows an example of a transmitting apparatus and/or receiving apparatus of the present specification.

In the example of FIG. 1, various technical features described below may be performed. FIG. 1 relates to at least one station (STA). For example, STAs 110 and 120 of the present specification may also be called in various terms such as a mobile terminal, a wireless device, a wireless transmit/receive unit (WTRU), a user equipment (UE), a mobile station (MS), a mobile subscriber unit, or simply a user. The STAs 110 and 120 of the present specification may also be called in various terms such as a network, a base station, a node-B, an access point (AP), a repeater, a router, a relay, or the like. The STAs 110 and 120 of the present specification may also be referred to as various names such as a receiving apparatus, a transmitting apparatus, a receiving STA, a transmitting STA, a receiving device, a transmitting device, or the like.

For example, the STAs 110 and 120 may serve as an AP or a non-AP. That is, the STAs 110 and 120 of the present specification may serve as the AP and/or the non-AP.

STAs 110 and 120 of the present specification may support various communication standards together in addition to the IEEE 802.11 standard. For example, a communication standard (e.g., LTE, LTE-A, 5G NR standard) or the like based on the 3GPP standard may be supported. In addition, the STA of the present specification may be implemented as various devices such as a mobile phone, a vehicle, a personal computer, or the like. In addition, the STA of the present specification may support communication for various communication services such as voice calls, video calls, data communication, and self-driving (autonomous-driving), or the like.

The STAs 110 and 120 of the present specification may include a medium access control (MAC) conforming to the IEEE 802.11 standard and a physical layer interface for a radio medium.

The STAs 110 and 120 will be described below with reference to a sub-figure (a) of FIG. 1.

The first STA 110 may include a processor 111, a memory 112, and a transceiver 113. The illustrated process, memory, and transceiver may be implemented individually as separate chips, or at least two blocks/functions may be implemented through a single chip.

The transceiver 113 of the first STA performs a signal transmission/reception operation. Specifically, an IEEE 802.11 packet (e.g., IEEE 802.11a/b/g/n/ac/ax/be, etc.) may be transmitted/received.

For example, the first STA 110 may perform an operation intended by an AP. For example, the processor 111 of the AP may receive a signal through the transceiver 113, process a reception (RX) signal, generate a transmission (TX) signal, and provide control for signal transmission. The memory 112 of the AP may store a signal (e.g., RX signal) received through the transceiver 113, and may store a signal (e.g., TX signal) to be transmitted through the transceiver.

For example, the second STA 120 may perform an operation intended by a non-AP STA. For example, a transceiver 123 of a non-AP performs a signal transmission/reception operation. Specifically, an IEEE 802.11 packet (e.g., IEEE 802.11a/b/g/n/ac/ax/be packet, etc.) may be transmitted/ received.

For example, a processor 121 of the non-AP STA may receive a signal through the transceiver 123, process an RX signal, generate a TX signal, and provide control for signal transmission. A memory 122 of the non-AP STA may store a signal (e.g., RX signal) received through the transceiver 123, and may store a signal (e.g., TX signal) to be transmitted through the transceiver.

For example, an operation of a device indicated as an AP in the specification described below may be performed in the first STA 110 or the second STA 120. For example, if the first STA 110 is the AP, the operation of the device indicated as the AP may be controlled by the processor 111 of the first STA 110, and a related signal may be transmitted or received through the transceiver 113 controlled by the processor 111 of the first STA 110. In addition, control information related to the operation of the AP or a TX/RX signal of the AP may be stored in the memory 112 of the first STA 110. In addition, if the second STA 120 is the AP, the operation of the device indicated as the AP may be controlled by the processor 121 of the second STA 120, and a related signal may be transmitted or received through the transceiver 123 controlled by the processor 121 of the second STA 120. In addition, control information related to the operation of the AP or a TX/RX signal of the AP may be stored in the memory 122 of the second STA 120.

For example, in the specification described below, an operation of a device indicated as a non-AP (or user-STA) may be performed in the first STA 110 or the second STA 120. For example, if the second STA 120 is the non-AP, the operation of the device indicated as the non-AP may be controlled by the processor 121 of the second STA 120, and a related signal may be transmitted or received through the transceiver 123 controlled by the processor 121 of the second STA 120. In addition, control information related to the operation of the non-AP or a TX/RX signal of the non-AP may be stored in the memory 122 of the second STA 120. For example, if the first STA 110 is the non-AP, the operation of the device indicated as the non-AP may be controlled by the processor 111 of the first STA 110, and a related signal may be transmitted or received through the transceiver 113 controlled by the processor 111 of the first STA 110. In addition, control information related to the operation of the non-AP or a TX/RX signal of the non-AP may be stored in the memory 112 of the first STA 110.

In the specification described below, a device called a (transmitting/receiving) STA, a first STA, a second STA, a STA1, a STA2, an AP, a first AP, a second AP, an AP1, an AP2, a (transmitting/receiving) terminal, a (transmitting/receiving) device, a (transmitting/receiving) apparatus, a network, or the like may imply the STAs 110 and 120 of FIG. 1. For example, a device indicated as, without a specific reference numeral, the (transmitting/receiving) STA, the first STA, the second STA, the STA1, the STA2, the AP, the first AP, the second AP, the AP1, the AP2, the (transmitting/receiving) terminal, the (transmitting/receiving) device, the (transmitting/receiving) apparatus, the network, or the like may imply the STAs 110 and 120 of FIG. 1. For example, in the following example, an operation in which various STAs transmit/receive a signal (e.g., a PPDU) may be performed in the transceivers 113 and 123 of FIG. 1. In addition, in the following example, an operation in which various STAs generate a TX/RX signal or perform data processing and computation in advance for the TX/RX signal may be performed in the processors 111 and 121 of FIG. 1. For example, an example of an operation for generating the TX/RX signal or performing the data processing and computation in advance may include: 1) an operation of determining/obtaining/configuring/computing/decoding/encoding bit information of a sub-field (SIG, STF, LTF, Data) included in a PPDU; 2) an operation of determining/configuring/obtaining a time resource or frequency resource (e.g., a subcarrier resource) or the like used for the sub-field (SIG, STF, LTF, Data) included the PPDU; 3) an operation of determining/configuring/obtaining a specific sequence (e.g., a pilot sequence, an STF/LTF sequence, an extra sequence applied to SIG) or the like used for the sub-field (SIG, STF, LTF, Data) field included in the PPDU; 4) a power control operation and/or power saving operation applied for the STA; and 5) an operation related to determining/obtaining/configuring/decoding/encoding or the like of an ACK signal. In addition, in the following example, a variety of information used by various STAs for determining/obtaining/configuring/computing/decoding/decoding a TX/RX signal (e.g., information related to a field/subfield/control field/parameter/power or the like) may be stored in the memories 112 and 122 of FIG. 1.

The aforementioned device/STA of the sub-figure (a) of FIG. 1 may be modified as shown in the sub-figure (b) of FIG. 1. Hereinafter, the STAs 110 and 120 of the present specification will be described based on the sub-figure (b) of FIG. 1.

For example, the transceivers 113 and 123 illustrated in the sub-figure (b) of FIG. 1 may perform the same function as the aforementioned transceiver illustrated in the sub-figure (a) of FIG. 1. For example, processing chips 114 and 124 illustrated in the sub-figure (b) of FIG. 1 may include the processors 111 and 121 and the memories 112 and 122. The processors 111 and 121 and memories 112 and 122 illustrated in the sub-figure (b) of FIG. 1 may perform the same function as the aforementioned processors 111 and 121 and memories 112 and 122 illustrated in the sub-figure (a) of FIG. 1.

A mobile terminal, a wireless device, a wireless transmit/receive unit (WTRU), a user equipment (UE), a mobile station (MS), a mobile subscriber unit, a user, a user STA, a network, a base station, a Node-B, an access point (AP), a repeater, a router, a relay, a receiving unit, a transmitting unit, a receiving STA, a transmitting STA, a receiving device, a transmitting device, a receiving apparatus, and/or a transmitting apparatus, which are described below, may imply the STAs 110 and 120 illustrated in the sub-figure (a)/(b) of FIG. 1, or may imply the processing chips 114 and 124 illustrated in the sub-figure (b) of FIG. 1. That is, a technical feature of the present specification may be performed in the STAs 110 and 120 illustrated in the sub-figure (a)/(b) of FIG. 1, or may be performed only in the processing chips 114 and 124 illustrated in the sub-figure (b) of FIG. 1. For example, a technical feature in which the transmitting STA transmits a control signal may be understood as a technical feature in which a control signal generated in the processors 111 and 121 illustrated in the sub-figure (a)/(b) of FIG. 1 is transmitted through the transceivers 113 and 123 illustrated in the sub-figure (a)/(b) of FIG. 1. Alternatively, the technical feature in which the transmitting STA transmits the control signal may be understood as a technical feature in which the control signal to be transferred to the transceivers 113 and 123 is generated in the processing chips 114 and 124 illustrated in the sub-figure (b) of FIG. 1.

For example, a technical feature in which the receiving STA receives the control signal may be understood as a technical feature in which the control signal is received by means of the transceivers 113 and 123 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (a) of FIG. 1 is obtained by the processors 111 and 121 illustrated in the sub-figure (a) of FIG. 1. Alternatively, the technical feature in which the receiving STA receives the control signal may be understood as the technical feature in which the control signal received in the transceivers 113 and 123 illustrated in the sub-figure (b) of FIG. 1 is obtained by the processing chips 114 and 124 illustrated in the sub-figure (b) of FIG. 1.

Referring to the sub-figure (b) of FIG. 1, software codes 115 and 125 may be included in the memories 112 and 122. The software codes 115 and 126 may include instructions for controlling an operation of the processors 111 and 121. The software codes 115 and 125 may be included as various programming languages.

The processors 111 and 121 or processing chips 114 and 124 of FIG. 1 may include an application-specific integrated circuit (ASIC), other chipsets, a logic circuit and/or a data processing device. The processor may be an application processor (AP). For example, the processors 111 and 121 or processing chips 114 and 124 of FIG. 1 may include at least one of a digital signal processor (DSP), a central processing unit (CPU), a graphics processing unit (GPU), and a modulator and demodulator (modem). For example, the processors 111 and 121 or processing chips 114 and 124 of FIG. 1 may be SNAPDRAGON™ series of processors made by Qualcomm®, EXYNOS™ series of processors made by Samsung®, A series of processors made by Apple®, HELIO™ series of processors made by MediaTek®, ATOM™ series of processors made by Intel® or processors enhanced from these processors.

In the present specification, an uplink may mean a link for communication from a non-AP STA to an AP STA, and an uplink PPDU/packet/signal or the like may be transmitted through the uplink. In addition, in the present specification, a downlink may mean a link for communication from the AP STA to the non-AP STA, and a downlink PPDU/packet/signal or the like may be transmitted through the downlink.

A WLAN sensing technology is a sort of radar technologies which can be implemented without a standard, but it is conceived that more powerful performance can be obtained through standardization. The IEEE 802.11bf standard defines an apparatus participating in wireless LAN sensing for each function as shown in the following table. According to the function thereof, the apparatus may be classified into an apparatus initiating WLAN sensing and an apparatus participating in the sensing, an apparatus transmitting a sensing physical layer protocol data unit (PPDU) and an apparatus receiving the PPDU.

TABLE 1

| Terminology | Function |
| --- | --- |
| Sensing Initiator | apparatus initiating sensing |
| Sensing Responder | apparatus participating in sensing |
| Sensing Transmitter | apparatus transmitting sensing PPDU |
| Sensing Receiver | apparatus receiving sensing PPDU |

Figure 2:
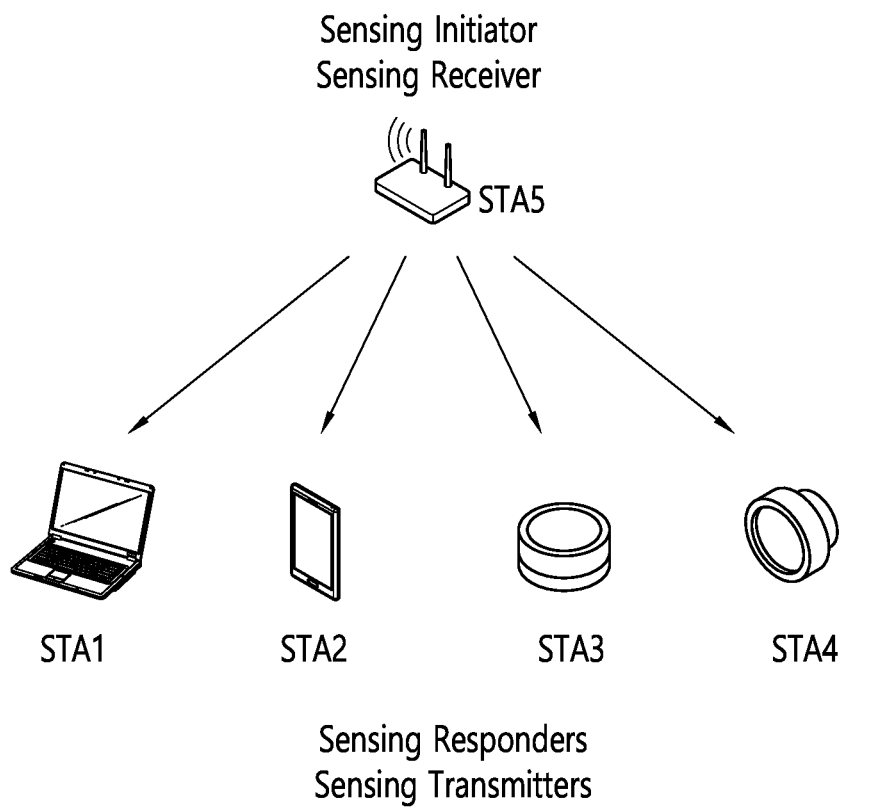
FIG. 2 illustrates an example of a WLAN sensing scenario using multiple sensing transmitting apparatuses.
Figure 3:
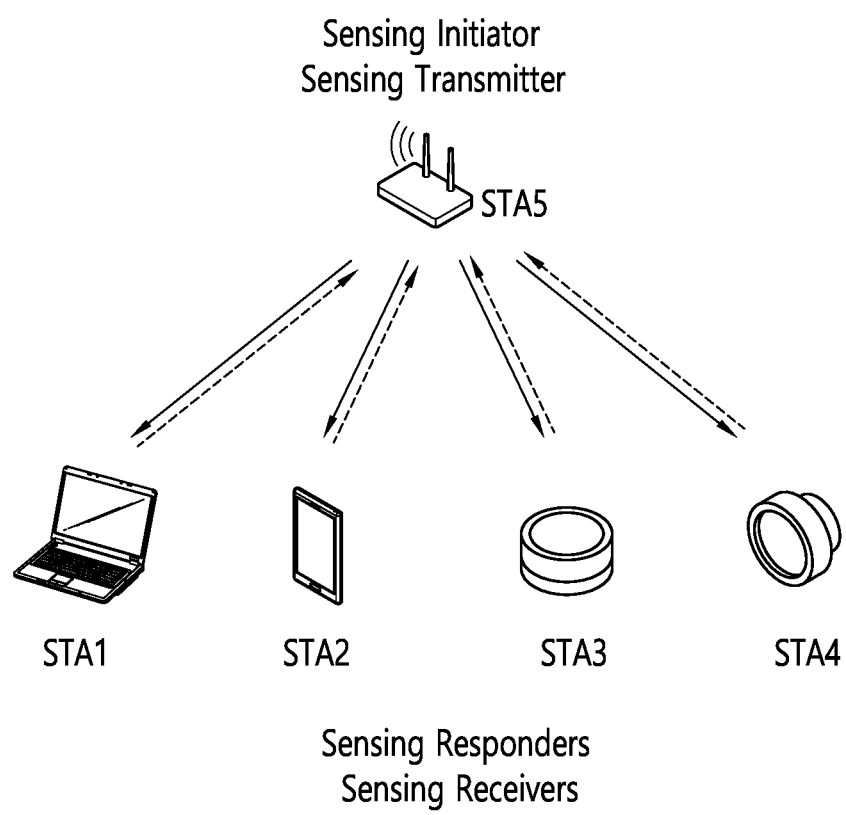
FIG. 3 illustrates an example of a WLAN sensing scenario using multiple sensing receiving apparatuses.

FIG. 2 illustrates an example of a WLAN sensing scenario using multiple sensing transmitting apparatuses. FIG. 3 illustrates an example of a WLAN sensing scenario using multiple sensing receiving apparatuses.

FIG. 2 and FIG. 3 illustrate a sensing scenario based on a function and deployment of a WLAN sensing apparatus. In an environment assuming one sensing initiation apparatus and multiple sensing participating apparatuses, FIG. 2 is a scenario using multiple sensing PPDU transmitting apparatuses, and FIG. 3 is a scenario using multiple sensing PPDU receiving apparatuses. Assuming that the sensing PPDU receiving apparatus includes a sensing measurement signal processing apparatus, in case of FIG. 3, a procedure for transmitting (feeding back) a sensing measurement result to the sensing initiation apparatus (STA 5) is additionally required.

Figure 4:
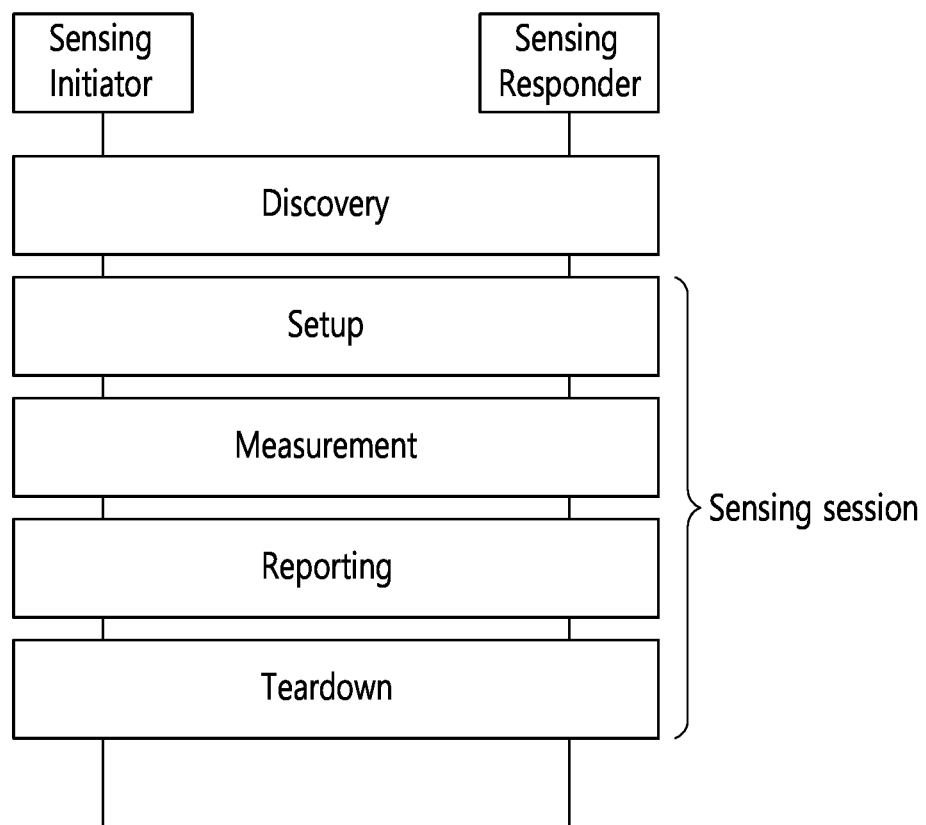
FIG. 4 illustrates an example of a WLAN sensing procedure.

FIG. 4 illustrates an example of a WLAN sensing procedure.

A procedure of WLAN sensing is performed as discovery, negotiation, measurement exchange, tear down, or the like between WLAN sensing initiation apparatus and participating apparatuses. The discovery is a process of identifying sensing capability of WLAN apparatuses. The negotiation is a process of determining a sensing parameter between the sensing initiation apparatus and participating apparatus. The measurement exchange is a process of transmitting a sensing PPDU and transmitting a sensing measurement result. The tear down is a process of terminating the sensing procedure.

Figure 5:
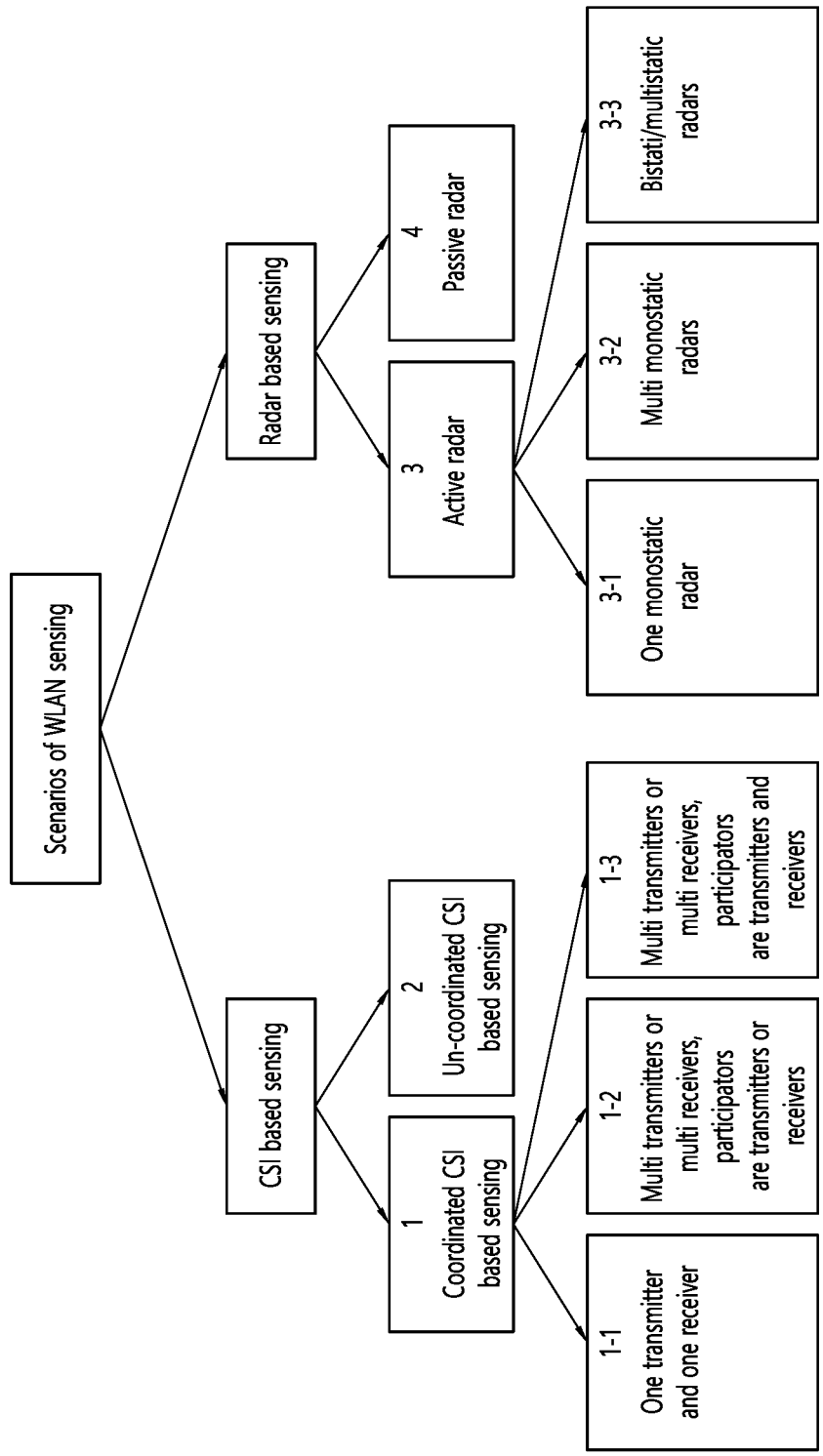
FIG. 5 is an example of classifying WLAN sensing.

FIG. 5 is an example of classifying WLAN sensing.

The WLAN sensing may be classified into CSI-based sensing which uses channel state information of a signal arrived at a receiver through a channel and radar-based sensing which uses a signal received after a transmission signal is reflected by an object. In addition, each sensing technology is classified again into a scheme (a coordinated CSI, active radar) in which a sensing transmitter directly participates in a sensing process and a scheme (un-coordinated CSI, passive radar) in which the sensing transmitter does not participate in the sensing process, i.e., there is no dedicated transmitter participating in the sensing process.

Figure 6:
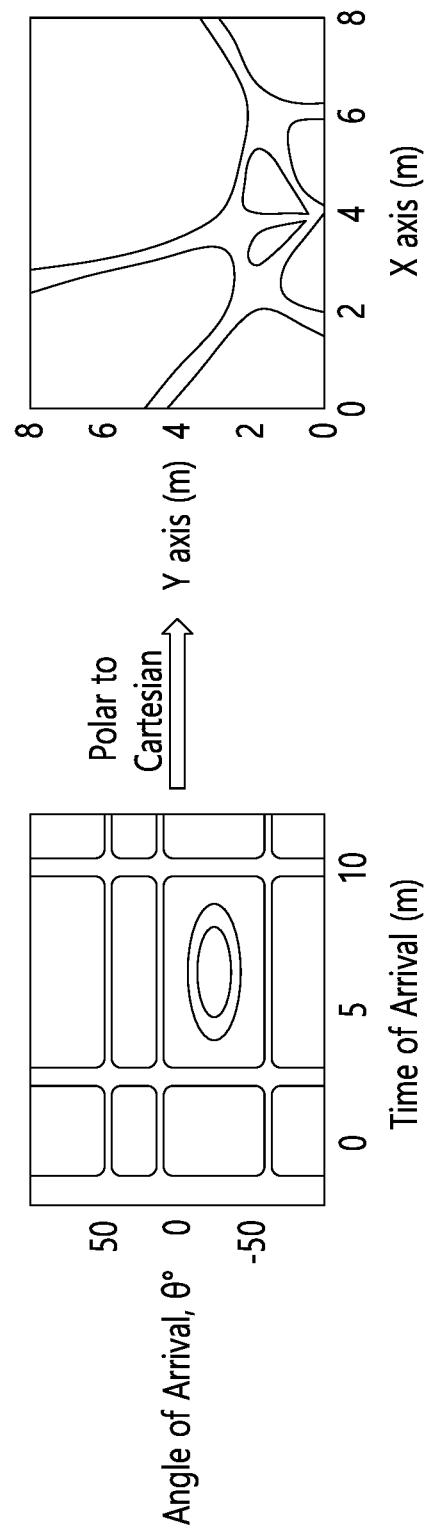
FIG. 6 illustrates indoor positioning which uses CSI-based WLAN sensing.

FIG. 6 illustrates indoor positioning which uses CSI-based WLAN sensing.

In FIG. 6, the CSI-based WLAN sensing is utilized in the indoor positioning. An angle of arrival and a time of arrival are obtained by using CSI, and then are converted into an orthogonal coordinate to obtain indoor positioning information.

Figure 7:
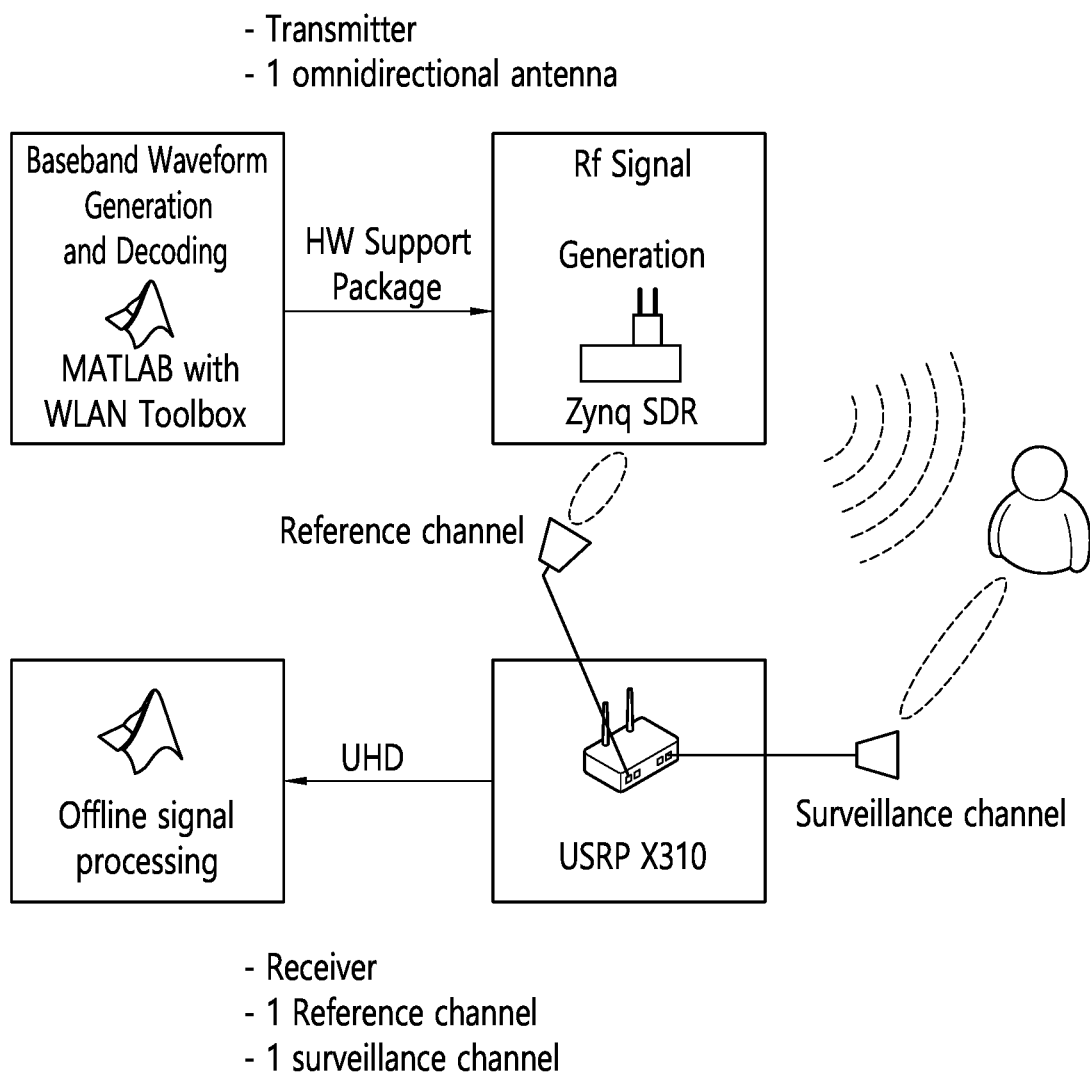
FIG. 7 is an example of implementing a WLAN sensing apparatus.

FIG. 7 is an example of implementing a WLAN sensing apparatus.

In FIG. 7, the WLAN sensing apparatus is implemented using a MATLAB toolbox, Zynq, and USRP. An IEEE 802.11ax WLAN signal is generated in the MATLAB toolbox, and an RF signal is generated using a Zynq software defined radio (SDR). A signal passing through a channel is received using a USRP SDR, and sensing signal processing is performed in the MATLAB toolbox. Herein, one reference channel (a channel which can be directly received from a sensing transmitter) and one surveillance channel (a channel which can be received by being reflected by an object) are assumed. As a result of analysis using the WLAN sensing apparatus, it is possible to obtain a unique feature capable of identifying a motion or a body action.

The IEEE 802.11bf WLAN sensing standardization is in an initial stage of development at present, and it is expected that a cooperative sensing technology for improving sensing accuracy will be treated to be important in the future. It is expected that a synchronization technology of a sensing signal for cooperative sensing, a CSI management and usage technology, a sensing parameter negotiation and sharing technology, a scheduling technology for CSI generation, or the like will be a core subject for standardization. In addition, it is also expected that a long-distance sensing technology, a low-power sensing technology, a sensing security and privacy protection technology, or the like will be reviewed as a main agenda.

IEEE 802.11bf WLAN sensing is a sort of radar technologies using a WLAN signal which exists anywhere anytime. The following table shows a typical case of using IEEE 802.11bf, which may be utilized in a wide range of daily life such as indoor detection, motion recognition, health care, 3D vision, in-vehicle detection, or the like. Since it is mainly used indoors, an operating range is usually within 10 to 20 meters, and distance accuracy does not exceed up to 2 meters.

TABLE 2

| Name | details | Max range (m) | Key Performance Indicator | Range Accuracy (m) | Max Velocity (m/s)/Velocity Accuracy | angular Accuracy (deg) |
| --- | --- | --- | --- | --- | --- | --- |
| Room Sensing | presence detection, counting the number of people in the room | 15 | Number of Persons in Room | 0.5-2 | 2/0.1 | |
| Smart meeting room | presence detection, counting the number of people in the room, localization of active people | 10 | Location of persons in room | 0.5-2 | 1/0.1-0.3 | |
| Motion detection in a room | Detection of motion of in a room (of Human) | 10 | | | | |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| Home security | Detection of presence of intruders in a home | 10 | Detection of a person in a room | 0.5-2 | 3/0.1-0.3 | medium |
| Audio with user tracking | Tracking persons in a room and pointing the sound of an audio system at those people | 6 | Localization of persons to within 0.2 m | 0.2 | 0.5/0.05 | 3 |
| Store Sensing | Counting number of people in a store, their location, speed of movement. Accuracy less important | 20 | Number and location of persons in store | 0.5-2 | 1/0.1-0.3 | 3 |
| Home Appliance Control | Tracking person and motion/gesture detection | 10 | Gesture Detection | <1 | | |
| Gesture recognition - short range (finger movement) | Identification of a gesture from a set of gestures - range <0.5 m | 0.5 | Gesture Detection | | 7 | 3 |
| Gesture recognition - medium range (hand movement) | Indentification of a gesture from a set of gestures - range >0.5 m | 2 | Gesture Detection | | | |
| Gesture recognition - large range (full body movement) | Indentification of a gesture from a set of gestures - range >2 m | 7 | Gesture Detection | 0.2 | 2/0.1 | 5 |
| Aliveliness detection | Determination whether a close by object is alive or not | 1 | Aliveliness Detection | 0.05 | | |
| Face/Body Recognition | Selection of the identity of a person from a set of known persons | 1 | Identity detection | 0.02 | | |
| Proximity Detection | Detection of object in close proximity of device | 0.5 | Object Detection | 0.02-2 | 1.5/0.2 | none |
| Home Appliance Control | Gesture Detection | 3 | Gesture Detection | <1 | 3/0.1 | |
| health care - Fall detection | Fall detection - abnormal position detection | 10 | | 0.2 | 3/0.1 | |
| Health case - remote diagnostics | measurements of breathing rate, heart rate etc. | 5 | Breathing rate accuracy/Pulse Accuracy | 0.5 | 2/0.1 | |
| Surveillance/ Monitoring of elder people and/or children | Tracking person and presence detection | 10 | Detection and localization of person | 0.2-2 | 3/0.1 | |
| Sneeze sensing | Detecting and localizing the target human and sneeze droplet volume | 10 | Detection and localization of person and sneeze droplet volume | 0.2-0.5 | 20/0.1 | |
| 3d vision | building a 3d picture of an environment, using multiple STA | 10 | accuracy of 3d map (range, angle) | 0.01 | 5/0.1 | 2 |

TABLE 2-continued

| Name | details | Max range (m) | Key Performance Indicator | Range Accuracy (m) | Max Velocity (m/s)/Velocity Accuracy | angular Accuracy (deg) |
|---|---|---|---|---|---|---|
| In car sensing - detection | detection of humans in car | 5 | Presence of Human in car | 0.1 | 1/0.1 | 3 |
| In car sensing | Driver sleepiness detection/ detection aid | 3 | Fast detection of driver sleepiness | 0.01 | 1/0.1 | 3 |

Figure 8:
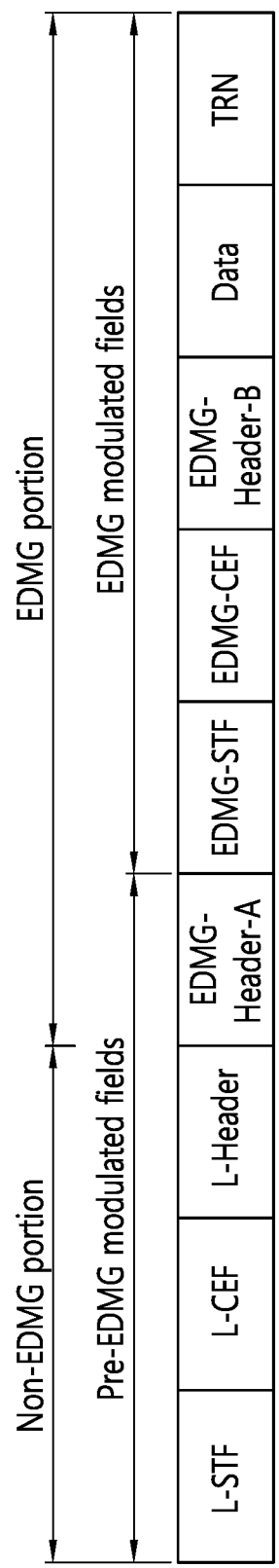
FIG. 8 briefly illustrates a PPDU structure supported in an 802.11ay WLAN system.

In IEEE 802.11, there is ongoing discussion on a technology for sensing a motion or gesture of an object (person or thing) using a Wi-Fi signal of 60 GHz (e.g., 802.11ad or 802.11ay signal). The present specification proposes a method of configuring a frame format used for Wi-Fi sensing and a Wi-Fi sensing sequence. FIG. 8 briefly illustrates a PPDU structure supported in an 802.11ay WLAN system.

As shown in FIG. 8, the PPDU format applicable to the 11ay system may include L-STF, L-CEF, L-Header, EDMG-Header-A, EDMG-STF, EDMG-CEF, EDMG-Header-B, Data, and TRN fields, and the aforementioned fields may be selectively included in accordance with the format of the PPDU (e.g., SU PPDU, MU PPDU, etc.).

Herein, a portion including the L-STF, L-CEF, and L-header fields may be referred to as a non-EDMG portion, and the remaining portion may be referred to as an EDMG portion. Additionally, the L-STF, L-CEF, L-Header, and EDMG-Header-A fields may be referred to as pre-EDMG modulated fields, and the remaining portions may be referred to as EDMG modulated fields.

The EDMG-Header-A field includes information required to demodulate an EDMG PPDU. The definition of the EDMG-Header-A field is the same as those of the EDMG SC mode PPDU and the EDMG OFDM mode PPDU, but is different from the definition of the EDMG control mode PPDU.

A structure of EDMG-STF depends on the number of consecutive 2.16 GHz channels through which the EDMG PPDU is transmitted and an index $i_{STS}$ of an $i_{STS}$-th space-time stream. For single space-time stream EDMG PPDU transmission using an EDMG SC mode through one 2.16 GHz channel, an EDMG-STF field does not exist. For EDMG SC transmission, the EDMG-STF field shall be modulated using pi/(2-BPSK).

A structure of EDMG-CEF depends on the number of consecutive 2.16 GHz channels through which the EDMG PPDU is transmitted and the number of space-time streams $i_{STS}$. For single space-time stream EDMG PPDU transmission using the EDMG SC mode through one 2.16 GHz channel, an EDMG-CEF field does not exist. For EDMG SC transmission, the EDMG-CEF field shall be modulated using pi/(2-BPSK).

A (legacy) preamble part of the PPDU may be used for packet detection, automatic gain control (AGC), frequency offset estimation, synchronization, indication of modulation (SC or OFDM) and channel estimation. A format of the preamble may be common to both an OFDM packet and an SC packet. In this case, the preamble may be constructed of a short training field (STF) and a channel estimation (CE) field located after the STF field.

Figure 9:
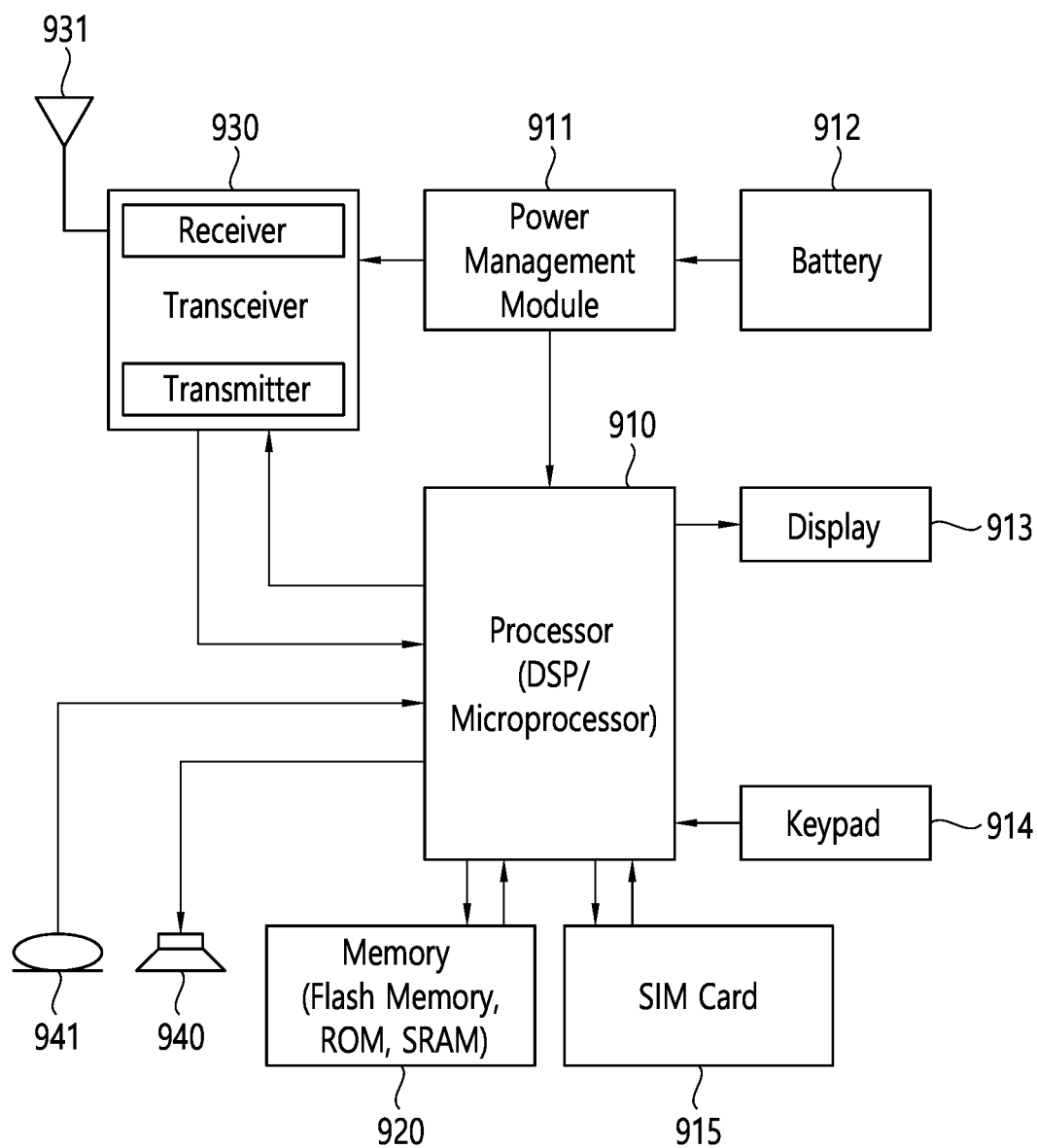
FIG. 9 illustrates an example of a PPDU used in the present specification.

FIG. 9 illustrates an example of a modified transmitting apparatus and/or receiving apparatus of the present specification.

Each apparatus/STA of the sub-figure (a)/(b) of FIG. 1 may be modified as shown in FIG. 9. A transceiver 930 of FIG. 9 may be identical to the transceivers 113 and 123 of FIG. 1. The transceiver 930 of FIG. 9 may include a receiver and a transmitter.

A processor 910 of FIG. 9 may be identical to the processors 111 and 121 of FIG. 1. Alternatively, the processor 910 of FIG. 9 may be identical to the processing chips 114 and 124 of FIG. 1.

A memory 920 of FIG. 9 may be identical to the memories 112 and 122 of FIG. 1. Alternatively, the memory 920 of FIG. 9 may be a separate external memory different from the memories 112 and 122 of FIG. 1.

Referring to FIG. 9, a power management module 911 manages power for the processor 910 and/or the transceiver 930. A battery 912 supplies power to the power management module 911. A display 913 outputs a result processed by the processor 910. A keypad 914 receives inputs to be used by the processor 910. The keypad 914 may be displayed on the display 913. A SIM card 915 may be an integrated circuit which is used to securely store an international mobile subscriber identity (IMSI) and its related key, which are used to identify and authenticate subscribers on mobile telephony apparatuses such as mobile phones and computers.

Referring to FIG. 9, a speaker 940 may output a result related to a sound processed by the processor 910. A microphone 941 may receive an input related to a sound to be used by the processor 910.

In 11SENS, an 802.11ad and 802.11ay signal transmitting/receiving method which is a 60 GHz Wi-Fi technology is considered to sense a motion or gesture of an STA or person by using a 60 GHz Wi-Fi signal. For effective Wi-Fi sensing, the present specification proposes a method of configuring a sensing initiation frame, a transmission initiation frame, and a sensing signal, and a sensing sequence for transmitting/receiving the sensing initiation frame, the transmission initiation frame, and the sensing signal.

An STA described in the following description may be the apparatus of FIG. 1 and/or FIG. 9, and a PPDU may be the PPDU of FIG. 7. A device may be an AP or a non-AP STA.

A wireless local area network (WLAN) has been introduced for the purpose of short-distance data transmission using an unlicensed band. An IEEE 802.11 MAC/PHY-based WLAN (e.g. Wi-Fi) has become a representative technology which is at present deployed almost everywhere.

The WLAN (e.g., Wi-Fi) has been designed for data signal transmission, but a usage thereof has recently been extended for other purposes than data transmission.

A WLAN (e.g., Wi-Fi) signal transmitted from a transmitting end and delivered to a receiving end may include information on a transmission channel environment between both the transmitting and receiving ends. WLAN sensing refers to a technology which obtains recognition information for various surrounding environments by processing the transmission channel information obtained through the WLAN signal.

For example, cognitive information may include information obtained through a technology such as gesture recognition, fall detection by elder people, intrusion detection, human motion detection, health monitoring, pet movement detection, or the like.

An additional service may be provided through the recognition information, and WLAN sensing may be applied and used in various forms in daily life. As a method for increasing accuracy of WLAN sensing, devices having at least one WLAN sensing function may be used in the WLAN sensing. The WLAN sensing using the plurality of devices may use multiple pieces of information for a channel environment, and thus may obtain more accurate sensing information, compared to a method of using one device (e.g. a transmitting/receiving end).

WLAN (e.g., Wi-Fi) transmission is achieved in a broadband by using channel aggregation, channel bonding, or the like. In addition, there is ongoing discussion on WLAN transmission in a more extended broadband.

Recently, with a growing interest in a WLAN device which performs sensing by using a WLAN signal, there is ongoing discussion on this in IEEE 802.11 by organizing a study group. WLAN sensing may include various scenarios.

Figure 10:
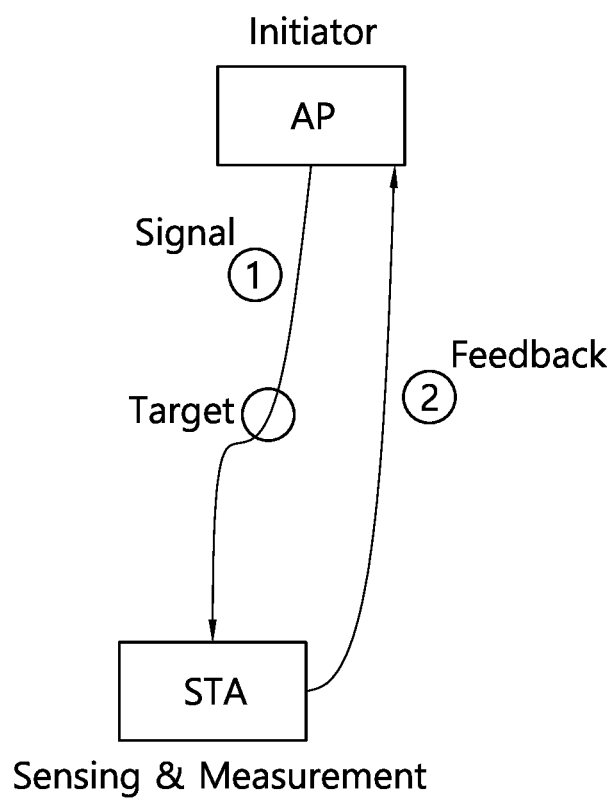
FIG. 10 illustrates an embodiment of WLAN sensing.

FIG. 10 illustrates an embodiment of WLAN sensing.

Referring to FIG. 10, a target to be sensed may be present, and STAs for performing sensing may be present. For example, an AP and an STA may perform sensing. The target may be present between the AP and the STA. For example, the AP may transmit a sensing signal to the STA, and the STA may transmit a feedback signal for the sensing signal to the AP. That is, the AP may transmit a signal to identify a sensing target, and the STA may receive a signal affected from the target and may perform measurement. The STA may transmit a measurement result to the AP, and the AP may identify the target, based on the measurement result.

WLAN sensing may include the following phases.
1) Setup Phase (Capability Negotiation)
2) Grouping Phase
3) Sensing Phase The present specification describes the grouping phase. A reference (or name) used in the present specification may be changed, and the STA may include an AP STA or a non-AP STA. For example, the setup phase, the grouping phase, the sensing phase, or the like may be called other names.

WLAN sensing may operate in various scenarios according to a sensing application. In particular, when a WLAN device operates in a limited space or a fixed WLAN device exists, a plurality of WLAN devices may constitute a sort of groups, and may perform sensing on a group basis. Of course, a mobile WLAN device may also perform sensing by dynamically constituting a group.

In the grouping phase, there may be an initiator which initiates grouping. Hereinafter, an STA which initiates grouping is referred to as a group owner (GO), and STAs other than the owner are referred to as a group member (GM). The GO may be an AP STA or a non-AP STA.

1) How to Determine GO

Static: The GO may be predetermined in a specific application or the like. For example, the GO may be predetermined by a higher layer or by a device itself. That is, a device (STA) which plays a role of the GO for initiating grouping is predetermined. For example, an STA capable of playing a role of the GO may be predetermined.

Dynamic: An STA which first transmits a frame for initiating grouping is the GO. For example, any STA has a capability to be the GO, and an STA which initiates grouping (i.e., an STA which transmits a grouping initiation frame) among the STAs may be the GO.

2) Grouping Initiation

A GO (e.g., the GO determined based on "1) How to determine GO") may transmit a frame capable of grouping initiation, and a frame which initiates grouping is referred to as a grouping initiation frame. In particular, a grouping procedure may vary depending on whether there is information for an STA capable of performing grouping, based on a capability in a basic service set (BSS) to which the GO belongs. Herein, the information may include not only the capability but also a receiver address (RA), an STA identifier (ID) (e.g., association ID (AID)), or the like.

The GO may include, by default, the following information in the grouping initiation frame, and this is not limited thereto.

Group ID (GID) or Session ID: An ID capable of identifying a group. That is, an ID capable of identifying whether it belongs to a group participating in a sensing session.

Number of Sensing Session: The number of sensing sessions that a group will have after the group is created. For example, the sensing session may be defined as one cycle in which a result from initial sensing to final sensing is transmitted and received. The sensing session may mean a time duration in which a series of sensing procedures is performed. For example, a transmission opportunity (TXOP) may be the sensing session. For example, multiple TXOPs may constitute one sensing session.

Information included in the grouping initiation frame may vary depending on each procedure described below.

2-1) when GO is Aware of Information for STA in BSS

A. When there is No Response

Figure 11:
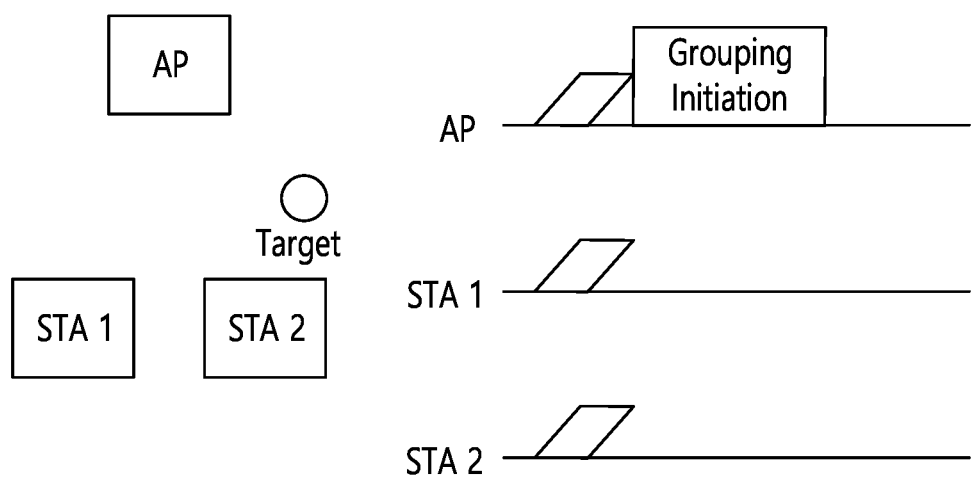
FIG. 11 illustrates an embodiment of a group initiation method.

FIG. 11 illustrates an embodiment of a group initiation method.

Referring to FIG. 11, a GO (e.g., AP) may announce a GID by transmitting a grouping initiation frame. That is, the GO may transmit the grouping initiation frame, and the grouping initiation frame may include the GID. STAs (e.g., STA 1, STA 2) which have received the grouping initiation frame including the GID may know that a sensing operation based on the GID is to be performed.

In this method, there is no overhead for a response frame, but since it is not known which STA participates in the group, the GO may unnecessarily transmit a frame to an STA not participating in sensing in a sensing process for identifying a target.

For example, even if an AP transmits a grouping initiation frame with an intention of including an STA 1 and an STA 2 in a group, the STA 1 and/or the STA 2 may not be able to receive the grouping initiation frame in practice, and even if the STA 1 and/or the STA 2 receive the grouping initiation frame, there may be a case where the STA does not or cannot participate in sensing. In this case, the AP may transmit a frame for sensing to the STA not participating in sensing.

B. When there is a Response A grouping initiation frame transmitted by a GO may include a GID. The grouping initiation frame may include an information list (e.g., AID) for an STA to inquire the STA whether to participate in a group. For example, STAs included in the grouping initiation frame may be requested to participate in the group. In addition, information of an STA for initiating sensing first in each sensing session may also be included in the grouping initiation frame. That is, the GO is not necessarily an initiator in each sensing session, and grouping initiation and sensing initiation may be performed by different STAs. In addition, a sensing initiation STA may differ for each sensing session.

If there is a response for the grouping initiation frame, the GO may know which STA participates in a group. Therefore, the method B has higher reliability than the method A. That is, an unnecessary overhead may be reduced in a sensing process for identifying a target. However, an STA excluded in initiation is not considered.

Hereinafter, group initiation methods are described based on several methods in which STAs receiving a grouping initiation frame transmit a response frame.

Polling-Based Response

When a grouping initiation frame includes an STA list, the STA list may include information related to an order by which a grouping response frame is transmitted explicitly. Alternatively, polling may be performed implicitly in the indicated order. For example, the grouping initiation frame may be transmitted to STAs in an orderly manner, and the STAs may transmit the grouping response frame in the order by which the grouping initiation frame is received. In this method, the more the STAs, the higher the overhead may be.

Figure 12:
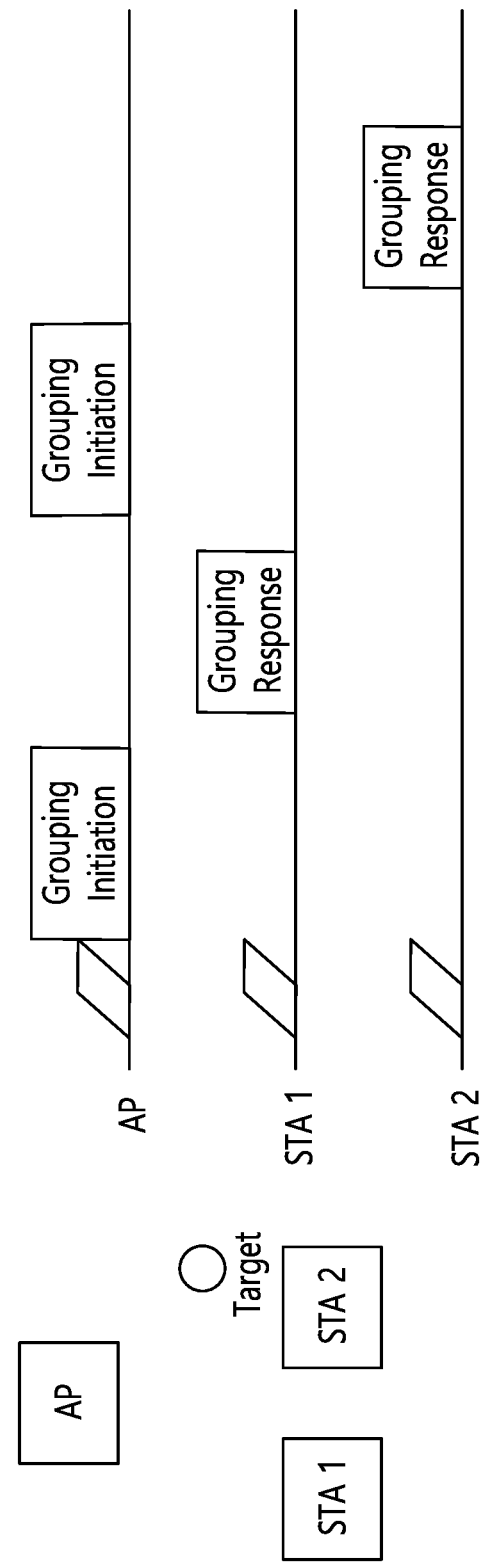
FIG. 12 illustrates an embodiment of a group initiation method.

FIG. 12 illustrates an embodiment of a group initiation method.

Referring to FIG. 12, an AP may first transmit a grouping initiation frame to an STA 1, and then may transmit it to an STA 2. Each of the STA 1 and the STA 2 may transmit a grouping response frame after receiving the grouping initiation frame. That is, when the STA 1 and the STA 2 are indicated in an orderly manner, polling is performed from the STA 1, and then the STA 2 may be polled.

OFDMA-Based Response

Similarly to the 11ax trigger frame, a grouping initiation frame may include scheduling information for an RU to which STAs will respond. However, in this method, all receiving STAs shall support at least 11ax.

Figure 13:
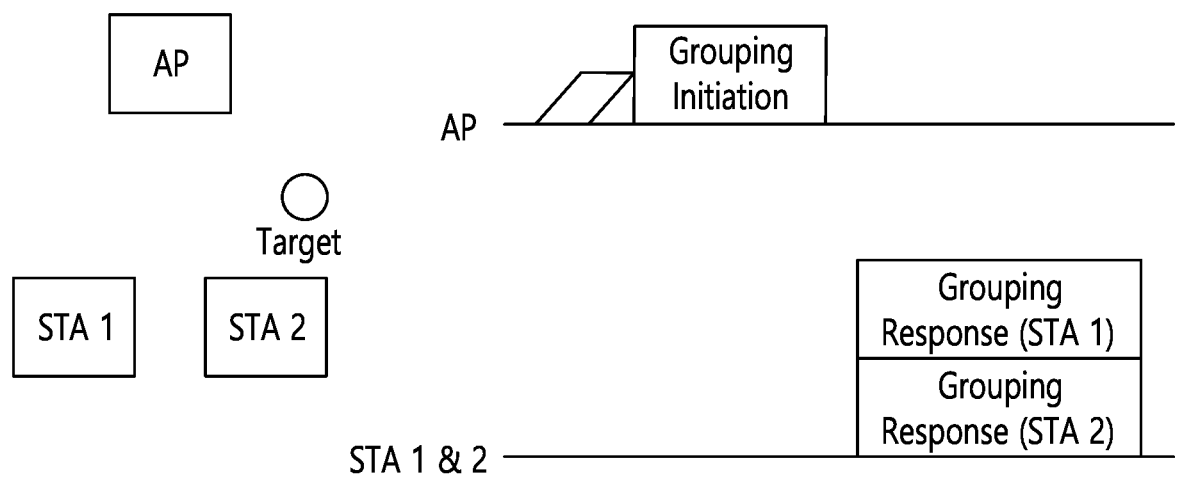
FIG. 13 illustrates an embodiment of a group initiation method.

FIG. 13 illustrates an embodiment of a group initiation method.

Referring to FIG. 13, an AP may transmit a grouping initiation frame to an STA 1 and an STA 2. The grouping initiation frame may include information on an RU to which each of STAs (i.e., STA 1 and STA 2) will transmit a grouping response frame. The STA 1 and the STA 2 may transmit the grouping response frame through an RU allocated thereto on the same time resource.

Back-Off Based Response

Figure 14:
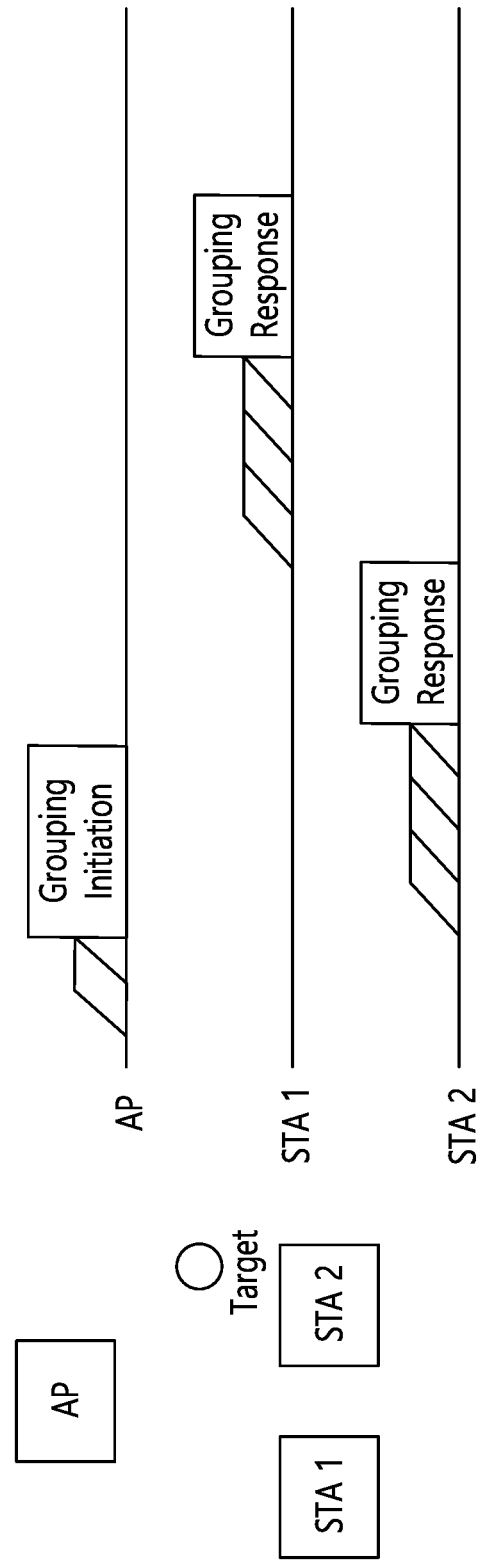
FIG. 14 illustrates an embodiment of a group initiation method.

FIG. 14 illustrates an embodiment of a group initiation method.

Referring to FIG. 14, each of STAs which have received a grouping initiation frame may transmit a response frame through back-off. That is, each of the STAs which have received the grouping initiation frame may transmit a grouping response frame through a contention-based channel access. For example, the STAs may transmit the grouping response frame in a contention-based enhanced distributed channel access (EDCA) scheme. A grouping initiation frame transmitted by a GO may not include an STA information list. The GO may constitute a group only for STAs which have transmitted a response within a pre-set threshold (e.g., a waiting time for the response). That is, only STAs which have transmitted a grouping response frame within a specific time after the GO transmits a grouping initiation frame may be included in a group for sensing, and the STAs included in the group may perform the sensing. For example, when an STA 2 succeeds in channel access before an STA 1, the STA 2 may transmit a grouping response frame first, and then the STA 1 which has succeed in the channel access may transmit the grouping response frame.

2-2) when Information on STA in BSS is not Known (i.e., when there is No Information Related to STA or when Information Related to STA is not Sufficient)

For example, the back-off response method of 2-1) above may be used.

A grouping initiation frame transmitted by a GO may include not only a GID but also a capability related to sensing currently desired. For example, the grouping initiation frame may include the channel measurement method/type or, if sensing is performed, the available band/bandwidth or the like. In addition, a responding STA may also transmit this information. That is, a grouping response frame may also include the channel measurement method type or, if sensing is performed, the available band/bandwidth or the like.

Therefore, the back-off based response process of 2-1) may be directly used, or the GO may respond again for a received grouping response by using a 3-way handshake method to finally determine whether to be included in a group.

Figure 15:
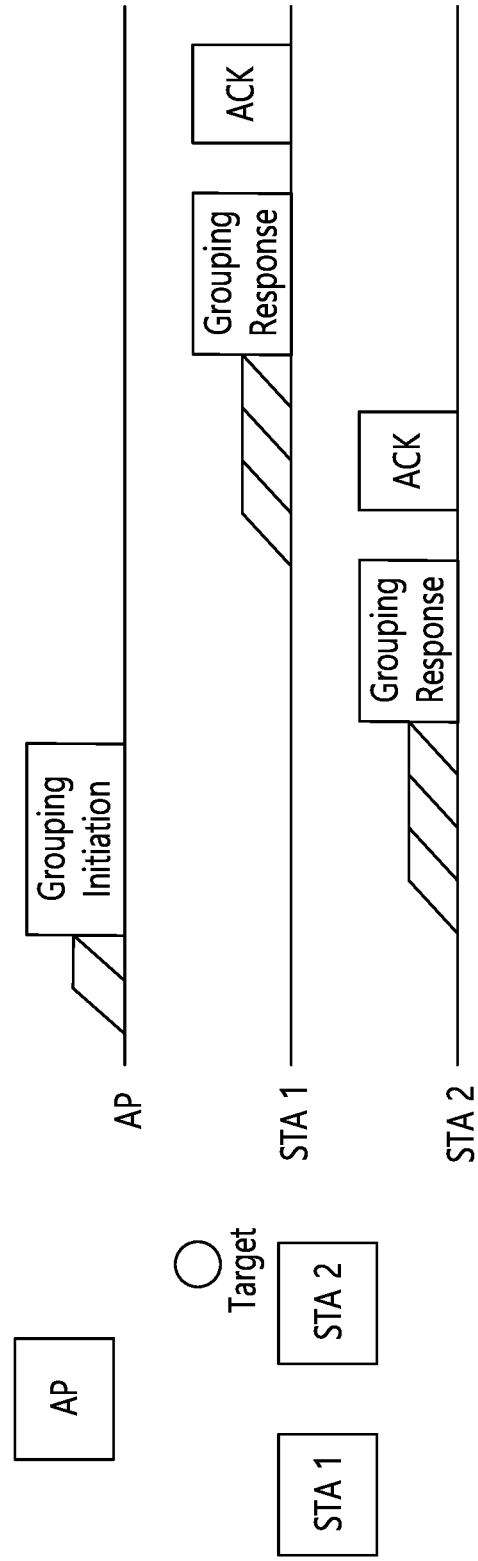
FIG. 15 illustrates an embodiment of a group initiation method.

FIG. 15 illustrates an embodiment of a group initiation method.

Referring to FIG. 15, an AP may transmit a grouping initiation frame, and STAs which have received the grouping initiation frame may transmit a grouping response frame. Each of the STAs which have received the grouping initiation frame may transmit a grouping response frame through a contention-based channel access. For example, the STAs may transmit the grouping response frame in a contention-based enhanced distributed channel access (EDCA) scheme. A grouping initiation frame transmitted by a GO may not include an STA information list. The GO may constitute a group only for STAs which have transmitted a response within a pre-set threshold (e.g., a waiting time for the response). That is, only STAs which have transmitted a grouping response frame within a specific time after the GO transmits a grouping initiation frame may be included in a group for sensing, and the STAs included in the group may perform the sensing. For example, when an STA 2 succeeds in channel access before an STA 1, the STA 2 may transmit a grouping response frame first, and then the STA 1 which has succeed in the channel access may transmit the grouping response frame. For example, the STAs which have received the grouping response frame may transmit a grouping response frame and an ACK frame.

For example, an AP which has received the grouping response frame may transmit a final confirmation signal regarding whether an STA which has finally transmitted the grouping response frame is to be included in a group. For example, the grouping response frame may include sensing capability information (e.g., a channel measurement method for sensing, supported band/bandwidth information), and a grouping initiation STA (e.g., AP) may determine whether the STA is to be included in the group, based on sensing capability information of the STA which has transmitted the grouping response frame.

Figure 16:
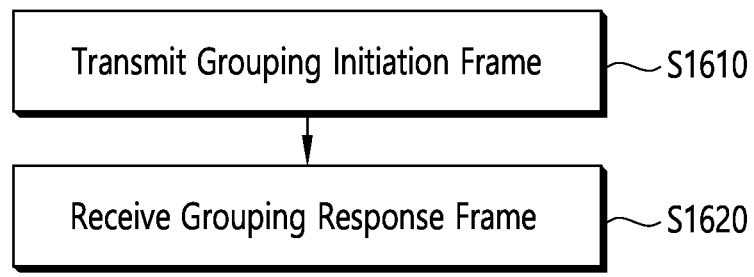
FIG. 16 illustrates an embodiment of a method of operating a transmitting STA.

FIG. 16 illustrates an embodiment of a method of operating a transmitting STA.

Referring to FIG. 16, operations of the transmitting STA may be based on technical features described with reference to at least one of FIG. 1 to FIG. 15.

The transmitting STA may transmit a grouping initiation frame (S1610). For example, the transmitting STA may transmit to a first receiving STA a first grouping initiation frame to create a group for performing sensing. For example, the first grouping initiation frame may include a session identifier (ID) for a sensing session and information related to the number of times of transmitting a sensing signal, performed in the sensing session.

For example, after receiving the first grouping response frame, the transmitting STA may transmit to a second receiving STA a second grouping initiation frame to create the group. For example, the second grouping initiation frame may include a session ID for a sensing session and information related to the number of times of transmitting a sensing signal, performed in the sensing session. For example, the transmitting STA may receive from the second receiving STA a second grouping response frame.

For example, the sensing session may include a time duration in which sensing signal transmission and sensing result information transmission are performed.

For example, the first grouping initiation frame may further include information related to a sensing initiator STA which initiates the sensing session.

For example, the sensing session may include at least one transmission opportunity (TXOP).

The transmitting STA may receive a grouping response frame (S1620). For example, the transmitting STA may receive the first grouping response frame from the first receiving STA.

For example, the first grouping response frame may be transmitted in a contention-based channel access scheme.

For example, the receiving STA may be included in the group, based on that the first grouping response frame is received from the first receiving STA within a pre-set threshold time from a transmission time of the first grouping initiation frame.

For example, each of STAs which have received a grouping initiation frame may transmit a response frame through back-off. That is, each of the STAs which have received the grouping initiation frame may transmit a grouping response frame through a contention-based channel access. For example, the STAs may transmit the grouping response frame in a contention-based enhanced distributed channel access (EDCA) scheme. A grouping initiation frame transmitted by a GO may not include an STA information list. The GO may constitute a group only for STAs which have transmitted a response within a pre-set threshold (e.g., a waiting time for the response). That is, only STAs which have transmitted a grouping response frame within a specific time after the GO transmits a grouping initiation frame may be included in a group for sensing, and the STAs included in the group may perform the sensing. For example, when an STA 2 succeeds in channel access before an STA 1, the STA 2 may transmit a grouping response frame first, and then the STA 1 which has succeed in the channel access may transmit the grouping response frame.

Figure 17:
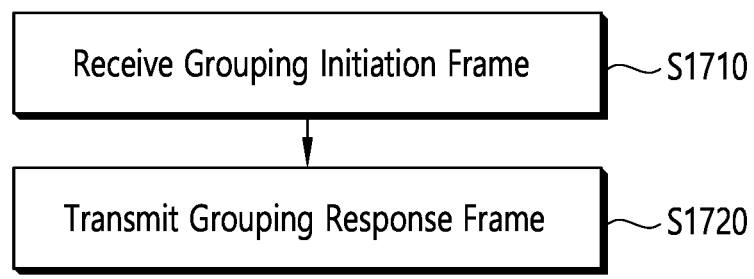
FIG. 17 illustrates an embodiment of a method of operating a receiving STA.

FIG. 17 illustrates an embodiment of a method of operating a receiving STA.

Referring to FIG. 17, operations of the receiving STA may be based on technical features described with reference to at least one of FIG. 1 to FIG. 15.

The receiving STA may receive a grouping initiation frame (S1710). For example, the receiving STA may receive from a transmitting STA the grouping initiation frame to create a group for performing sensing. For example, the grouping initiation frame may include a session identifier (ID) for a sensing session and information related to the number of times of transmitting a sensing signal, performed in the sensing session.

For example, the sensing session may include a time duration in which sensing signal transmission and sensing result information transmission are performed.

For example, the grouping initiation frame may further include information related to a sensing initiator STA which initiates the sensing session.

For example, the sensing session may include at least one transmission opportunity (TXOP).

The receiving STA may transmit a grouping response frame (S1720). For example, the receiving STA may receive the grouping response frame from the transmitting STA.

For example, the grouping response frame may be transmitted in a contention-based channel access scheme.

For example, the receiving STA may be included in the group, based on that the grouping response frame is received from the receiving STA within a pre-set threshold time from a transmission time of the grouping initiation frame.

For example, each of STAs which have received a grouping initiation frame may transmit a response frame through back-off. That is, each of the STAs which have received the grouping initiation frame may transmit a grouping response frame through a contention-based channel access. For example, the STAs may transmit the grouping response frame in a contention-based enhanced distributed channel access (EDCA) scheme. A grouping initiation frame transmitted by a GO may not include an STA information list. The GO may constitute a group only for STAs which have transmitted a response within a pre-set threshold (e.g., a waiting time for the response). That is, only STAs which have transmitted a grouping response frame within a specific time after the GO transmits a grouping initiation frame may be included in a group for sensing, and the STAs included in the group may perform the sensing. For example, when an STA 2 succeeds in channel access before an STA 1, the STA 2 may transmit a grouping response frame first, and then the STA 1 which has succeed in the channel access may transmit the grouping response frame.

Some of detailed steps shown in the example of FIG. 16 and FIG. 17 may not be essential steps and may be omitted. Other steps may be added in addition to the steps shown in FIG. 16 and FIG. 17, and orders of the steps may vary. Some steps the above steps may have independent technical meaning.

The aforementioned technical feature of the present specification may be applied to various apparatuses and methods. For example, the aforementioned technical feature of the present specification may be performed/supported through the apparatus of FIG. 1 and/or FIG. 9. For example, the aforementioned technical feature of the present specification may be applied only to part of FIG. 1 and/or FIG. 9. For example, the aforementioned technical feature of the present specification may be implemented based on the processing chips 114 and 124 of FIG. 1, or may be implemented based on the processors 111 and 121 and memories 112 and 122 of FIG. 1, or may be implemented based on the processor 910 and memory 920 of FIG. 9. For example, the apparatus of the present specification includes: a memory; and a processor operatively coupled to the memory. The processor may be configured to: transmit to a receiving STA a grouping initiation frame to create a group for performing sensing, wherein the grouping initiation frame includes a session identifier (ID) for a sensing session and information related to the number of times of transmitting a sensing signal, performed in the sensing session; and receive from the receiving STA a grouping response frame The technical feature of the present specification may be implemented based on a computer readable medium (CRM).

For example, the CRM proposed by the present specification is at least one computer readable medium having an instruction executed by at least one processor of a transmitting station (STA) of a wireless local area network (WLAN) system to perform an operation comprising: transmitting to a receiving STA a grouping initiation frame to create a group for performing sensing, wherein the grouping initiation frame includes a session identifier (ID) for a sensing session and information related to the number of times of transmitting a sensing signal, performed in the sensing session; and receiving from the receiving STA a grouping response frame.

Instructions stored in a CRM of the present specification may be executed by at least one processor. The at least one processor related to the CRM of the present specification may be the processors 111 and 121 or processing chips 114 and 124 of FIG. 1 or the processor 910 of FIG. 9. Meanwhile, the CRM of the present specification may be the memories 112 and 122 of FIG. 1 or the memory 920 of FIG. 9 or a separate external memory/storage medium/disk or the like.

The foregoing technical features of this specification are applicable to various applications or business models. For example, the foregoing technical features may be applied for wireless communication of a device supporting artificial intelligence (AI).

Artificial intelligence refers to a field of study on artificial intelligence or methodologies for creating artificial intelligence, and machine learning refers to a field of study on methodologies for defining and solving various issues in the area of artificial intelligence. Machine learning is also defined as an algorithm for improving the performance of an operation through steady experiences of the operation.

An artificial neural network (ANN) is a model used in machine learning and may refer to an overall problem-solving model that includes artificial neurons (nodes) forming a network by combining synapses. The artificial neural network may be defined by a pattern of connection between neurons of different layers, a learning process of updating a model parameter, and an activation function generating an output value.

The artificial neural network may include an input layer, an output layer, and optionally one or more hidden layers. Each layer includes one or more neurons, and the artificial neural network may include synapses that connect neurons. In the artificial neural network, each neuron may output a function value of an activation function of input signals input through a synapse, weights, and deviations.

A model parameter refers to a parameter determined through learning and includes a weight of synapse connection and a deviation of a neuron. A hyper-parameter refers to a parameter to be set before learning in a machine learning algorithm and includes a learning rate, the number of iterations, a mini-batch size, and an initialization function.

Learning an artificial neural network may be intended to determine a model parameter for minimizing a loss function. The loss function may be used as an index for determining an optimal model parameter in a process of learning the artificial neural network.

Machine learning may be classified into supervised learning, unsupervised learning, and reinforcement learning.

Supervised learning refers to a method of training an artificial neural network with a label given for training data, wherein the label may indicate a correct answer (or result value) that the artificial neural network needs to infer when the training data is input to the artificial neural network. Unsupervised learning may refer to a method of training an artificial neural network without a label given for training data. Reinforcement learning may refer to a training method for training an agent defined in an environment to choose an action or a sequence of actions to maximize a cumulative reward in each state.

Machine learning implemented with a deep neural network (DNN) including a plurality of hidden layers among artificial neural networks is referred to as deep learning, and deep learning is part of machine learning. Hereinafter, machine learning is construed as including deep learning.

The foregoing technical features may be applied to wireless communication of a robot.

Robots may refer to machinery that automatically process or operate a given task with own ability thereof. In particular, a robot having a function of recognizing an environment and autonomously making a judgment to perform an operation may be referred to as an intelligent robot.

Robots may be classified into industrial, medical, household, military robots and the like according uses or fields. A robot may include an actuator or a driver including a motor to perform various physical operations, such as moving a robot joint. In addition, a movable robot may include a wheel, a brake, a propeller, and the like in a driver to run on the ground or fly in the air through the driver.

The foregoing technical features may be applied to a device supporting extended reality.

Extended reality collectively refers to virtual reality (VR), augmented reality (AR), and mixed reality (MR). VR technology is a computer graphic technology of providing a real-world object and background only in a CG image, AR technology is a computer graphic technology of providing a virtual CG image on a real object image, and MR technology is a computer graphic technology of providing virtual objects mixed and combined with the real world.

MR technology is similar to AR technology in that a real object and a virtual object are displayed together. However, a virtual object is used as a supplement to a real object in AR technology, whereas a virtual object and a real object are used as equal statuses in MR technology.

XR technology may be applied to a head-mount display (HMD), a head-up display (HUD), a mobile phone, a tablet PC, a laptop computer, a desktop computer, a TV, digital signage, and the like. A device to which XR technology is applied may be referred to as an XR device.

The claims recited in the present specification may be combined in a variety of ways. For example, the technical features of the method claims of the present specification may be combined to be implemented as a device, and the technical features of the device claims of the present specification may be combined to be implemented by a method. In addition, the technical characteristics of the method claim of the present specification and the technical characteristics of the device claim may be combined to be implemented as a device, and the technical characteristics of the method claim of the present specification and the technical characteristics of the device claim may be combined to be implemented by a method.

What is claimed is:

1. A method performed in a wireless local area network (WLAN) system, the method comprising:
receiving, by an access point (AP), sensing capability information of a station (STA), wherein the capability information includes first information related to a bandwidth supported by the STA and second information related to whether the STA requires to be polled for measurement;

based on the sensing capability information, transmitting, by the AP, a sensing measurement request frame to request a sensing measurement session, wherein the sensing measurement request frame includes a session identifier (ID) for identifying the sensing measurement session, an Association ID (AID) of the STA, and a bandwidth field related to a bandwidth to be used between the AP and the STA; and determining, by the AP, whether the sensing measurement session is successful based on whether a sensing measurement response frame is received within a time threshold in response to the sensing measurement request frame.

2. The method of claim 1, wherein the sensing measurement session is determined to be successful based on the sensing measurement response frame is received within the time threshold.

3. The method of claim 1, wherein the AP transmits an acknowledgement (ACK) signal based on the sensing measurement session being successful.

4. An access point (AP) in a wireless local area network (WLAN) system, comprising:

a transceiver adapted to transmit and/or receive a wireless signal; and a processor adapted to control the transceiver, wherein the processor is further adapted to:

receive sensing capability information of a station (STA), wherein the capability information includes first information related to a bandwidth supported by the STA and second information related to whether the STA requires to be polled for measurement;

based on the sensing capability information, transmit a sensing measurement request frame to request a sensing measurement session, wherein the sensing measurement request frame includes a session identifier (ID) for identifying the sensing measurement session, an Association ID (AID) of the STA, and a bandwidth field related to a bandwidth to be used between the AP and the STA; and determining whether the sensing measurement session is successful based on whether a sensing measurement response frame is received within a time threshold in response to the sensing measurement request frame.

5. The AP of claim 4, wherein the sensing measurement session is determined to be successful based on the sensing measurement response frame is received within the time threshold.

6. The AP of claim 4, wherein the sensing initiator transmits an acknowledgement (ACK) signal based on the sensing measurement session being successful.

* * * * *